(No Model.)

4 Sheets—Sheet 1.

C. MORITZ.
APPARATUS FOR MAKING CRIMPED, PLAITED, OR CORRUGATED ARTICLES OF PAPER, METAL, &c.

No. 563,199.

Patented June 30, 1896.

Witnesses.
Geo. W. Rea.
Robert Everett.

Inventor.
Charles Moritz.
By James L. Norris.
Atty.

(No Model.) 4 Sheets—Sheet 3.

C. MORITZ.
APPARATUS FOR MAKING CRIMPED, PLAITED, OR CORRUGATED ARTICLES OF PAPER, METAL, &c.

No. 563,199. Patented June 30, 1896.

Witnesses.
Geo. W. Rea.
Robert Escott

Inventor:
Charles Moritz.
By James L. Norris.
Atty.

(No Model.) 4 Sheets—Sheet 4.
C. MORITZ.
APPARATUS FOR MAKING CRIMPED, PLAITED, OR CORRUGATED ARTICLES OF PAPER, METAL, &c.
No. 563,199. Patented June 30, 1896.
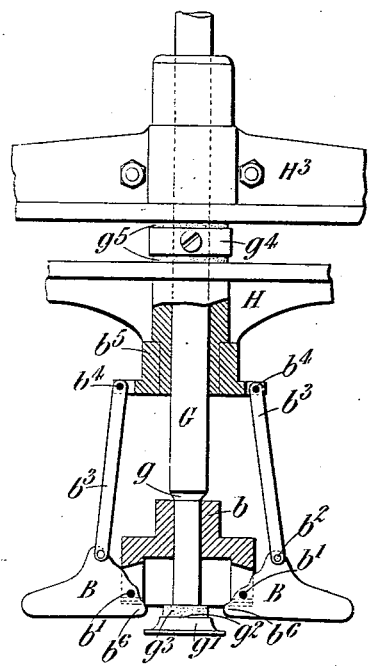
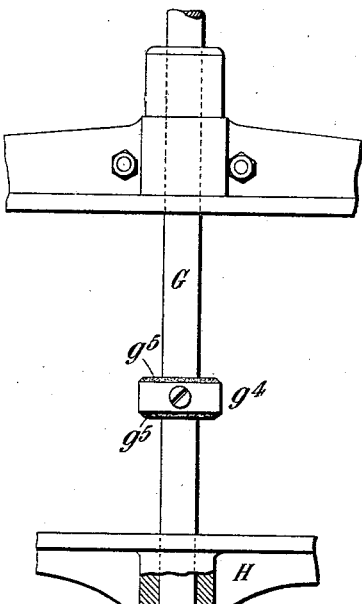
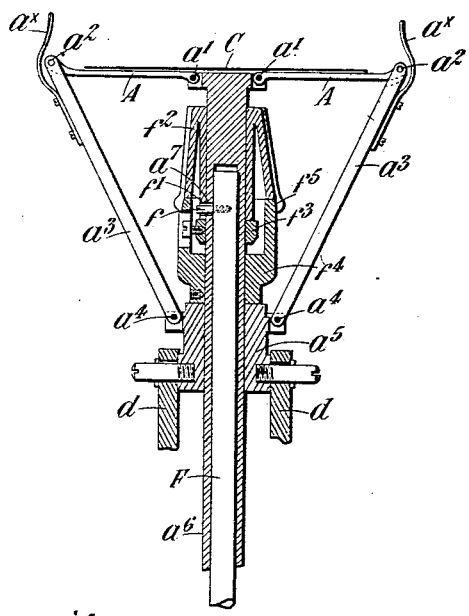
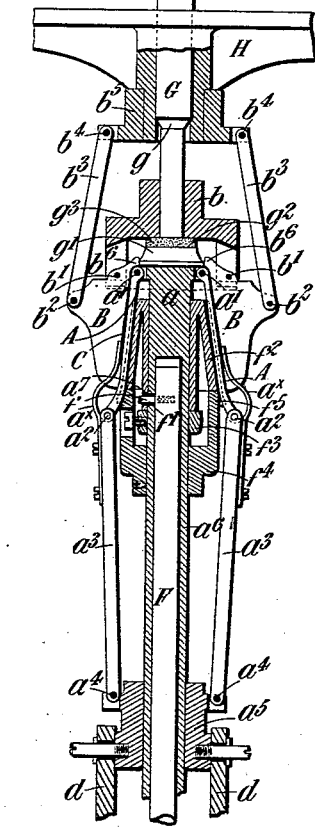
Witnesses:
Geo. W. Rea.
Robt Everett
Inventor:
Charles Moritz.
By James L. Norris,
Atty.

UNITED STATES PATENT OFFICE.

CHARLES MORITZ, OF LONDON, ENGLAND, ASSIGNOR OF TWO-THIRDS TO HENRY JOSEPH DRANE AND PERCY CHANT, OF SAME PLACE.

APPARATUS FOR MAKING CRIMPED, PLAITED, OR CORRUGATED ARTICLES OF PAPER, METAL, &c.

SPECIFICATION forming part of Letters Patent No. 563,199, dated June 30, 1896.

Application filed September 26, 1895. Serial No. 563,739. (No model.)

*To all whom it may concern:*

Be it known that I, CHARLES MORITZ, engineer, a subject of the Queen of Great Britain, residing at 1 Vineyard Walk, Clerkenwell, London, England, have invented certain new and useful Improved Apparatus or Machinery for Making Crimped, Plaited, or Corrugated Articles of Paper, Metal, or other Material, of which the following is a specification, reference being had to the accompanying drawings.

This invention relates to apparatus or machinery for making souffle-cases, bottle-capsules, and other crimped, plaited, or corrugated articles of paper, metal, or other pliable or ductile material.

My invention has for its object to provide improved mechanism for making corrugated cases or capsules of round, oval, elliptical, polygonal, or irregular shape at one operation.

The apparatus I have devised for the purpose of my invention comprises, essentially, two series of pivoted radial blades or bars, between which series the paper or other material to be plaited or corrugated is placed. By means of suitable mechanism one series of blades is caused to approach the other, and when arrived at the proper position relatively to each other the said blades are all simultaneously caused to turn inwardly about their pivots and by acting upon the sheet or blank of paper or other material placed between them impress thereon the plaitings or corrugations and at the same time impart thereto the desired shape.

In order that my said invention may be clearly understood and readily carried into effect, I will describe the same more fully with reference to the accompanying drawings, in which—

Figure 1:
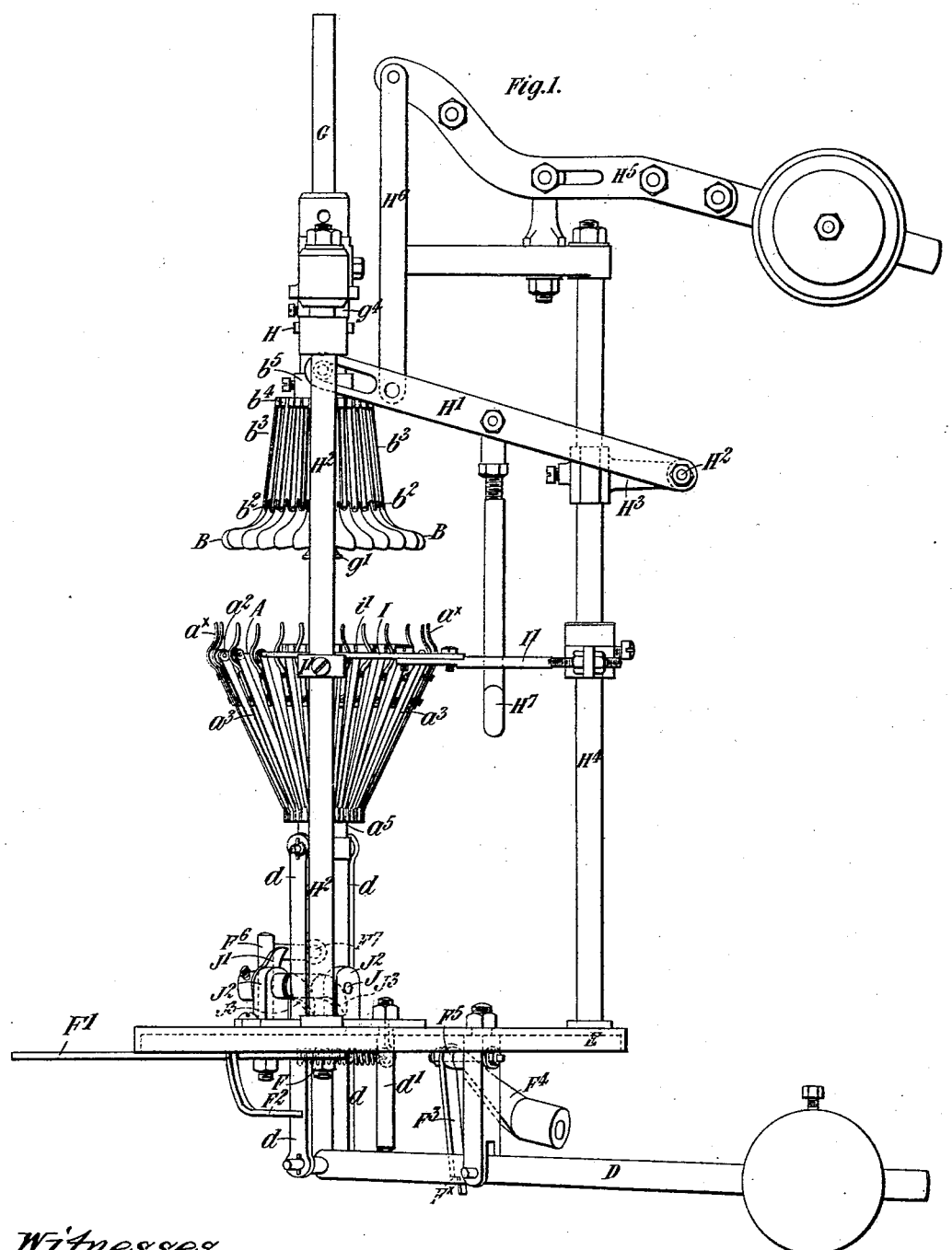
Figure 2:
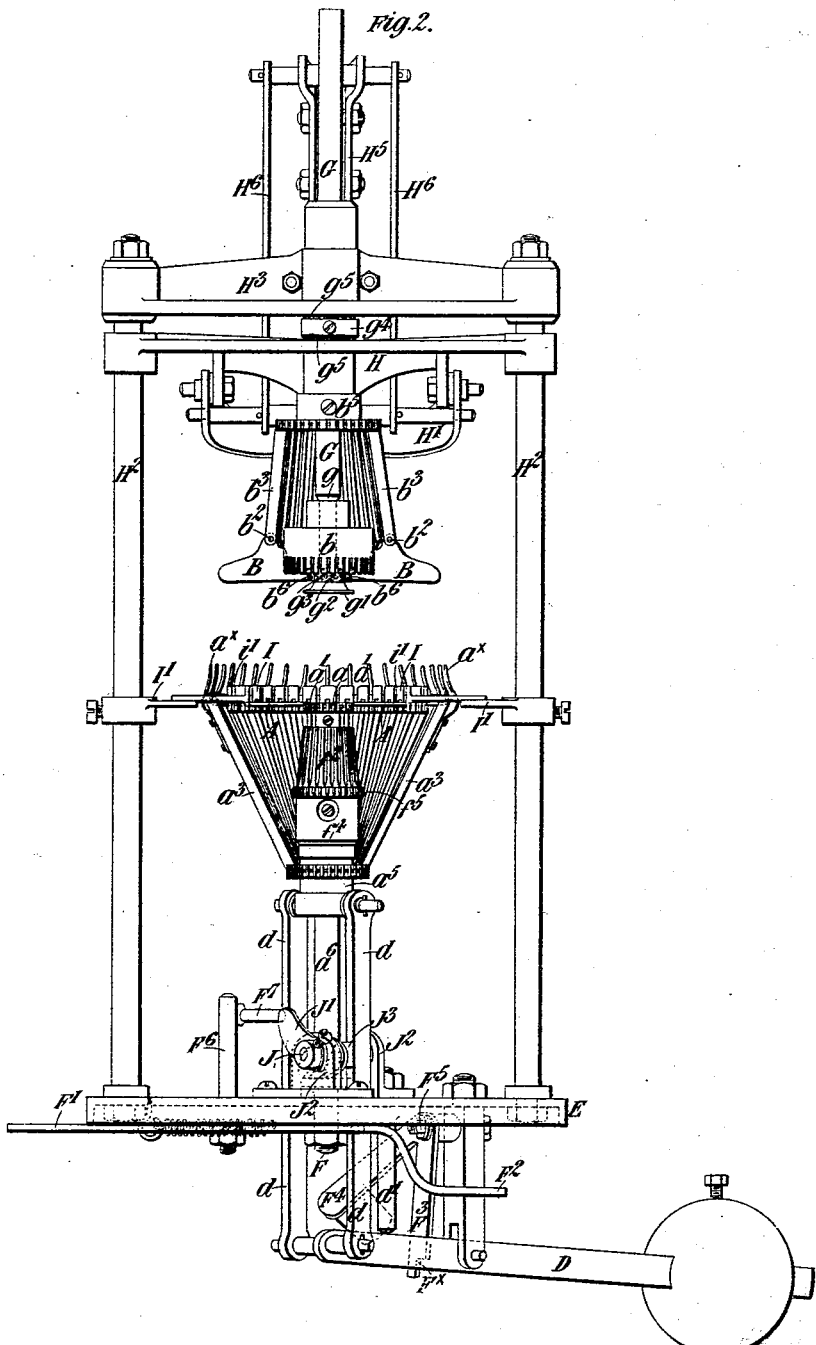
Figure 3:
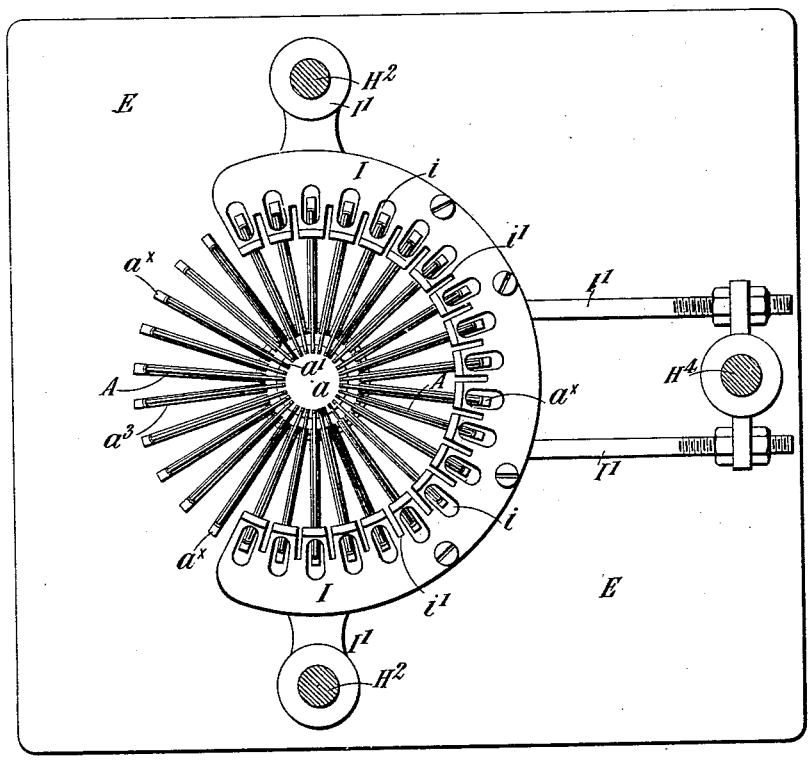

Figure 1 is a side elevation of an apparatus or machine constructed according to my invention and specially contrived to produce plaited or corrugated articles of circular shape. Fig. 2 is a front elevation of the same with some of the blades or bars in the upper and lower series removed in order that the parts which they surround may be more clearly seen. Fig. 3 is a plan of the lower series of blades or bars. Figs. 4 and 5 are vertical central sections of the two series of blades or bars, Fig. 4 representing them in the position they occupy when separated from each other ready to receive a blank, and Fig. 5 the position they occupy when the plaiting or corrugating of the blank has been effected. Fig. 6 represents one of the plaited or corrugated articles produced by this machine.

A is the lower series of radial bars, which I term the "plaiting-bars," B the upper series, which I term the "plaiting knives or blades," and C a sheet or blank of material upon which the plaiting-bars and plaiting-blades operate.

The plaiting-bars A are all hinged at their inner ends $a'$ to a central fixed block or head $a$, and are pivotally connected at their outer ends $a^2$ to a series of links $a^3$, which are hinged at their lower ends $a^4$ to a sleeve $a^5$. The aforesaid block or head $a$ forms part of a central stationary hollow spindle $a^6$, which projects from the base of the machine, and the sleeve $a^5$ is capable of sliding on this hollow spindle. A pivoted weighted lever D, which is connected by links $d\ d$ to the sliding sleeve, normally keeps the said sleeve raised and the plaiting-bars A in their horizontal position. A stop $d'$, depending from the base E of the machine, lies in the path of the lever D and limits the extent to which it, and consequently the sleeve, can rise. Extending through the base E and passing into the hollow spindle $a^6$ is a rotary spindle F, which carries near its upper end a pin $f$. This pin passes through a horizontal slot $a^7$ in the hollow spindle $a^6$ and enters a hole $f'$, formed for its reception in a rotary fluted conical block $f^2$. This conical block is supported in position upon the hollow spindle $a^6$ by a fixed collar $f^3$. Situated immediately below the conical block $f^2$ is a stationary cylindrical piece $f^4$, which has its upper edge formed with a series of slots $f^5$, into which the plaiting-bars enter when they assume their closed position, and are thus prevented from moving laterally when the conical block $f^2$ is turned, as hereinafter explained.

The plaiting-blades B are made of sheet metal and are all hinged at $b'$ to a central inverted cup or block $b$, which is mounted on a sliding rod G. The lower portion of this rod is reduced in diameter, so that a shoulder is formed at $g$, and at the lower extremity of the said rod is a disk $g'$, having a shoulder $g^2$, provided with a rubber washer $g^3$. This rod is also furnished with a fixed collar $g^4$, having rubber faces $g^5$. The plaiting-blades are pivotally connected at $b^2$ to the lower ends of links $b^3$, whose upper ends are hinged at $b^4$ to a sleeve $b^5$, which is connected to and moves with a cross-head H, capable of sliding on guide-rods or uprights K, projecting from the base E. This cross-head is connected to a forked bar H', which is pivoted at $H^2$ to a lug $H^3$, projecting from a vertical upright $H^4$, carried by the base of the machine. The forked bar H' is kept in its raised position, Fig. 1, by means of a weighted lever $H^5$, which is connected to the said forked bar by links $H^6$. Suspended from the forked bar H' is a rod $H^7$, which is connected by suitable means to a treadle or other device for depressing the said forked bar H' and cross-head H.

I is a segmental guide, which is carried by brackets I'. The brackets I' are adjustably supported on the rods K $H^4$ by collars $I^2$, which are held in their adjusted positions by set-screws $I^3$. The inner circumference of this guide is concentric with the head $a$ and enables the blank of paper or other material to be always placed centrally within the machine. Radial slots $i$ are formed in this guide to permit of the free movement of the upper ends of the links $a^3$, which are furnished with spring-fingers $a^\times$ at their upper ends. At the completion of the plaiting or corrugating operation these spring-fingers press upon the plaited article and prevent its expanding when the upper or plaiting blades are raised, as hereinafter explained. Other slots $i'$ are also formed in the segmental guide I to permit of the free movement of the plaiting-blades B during the plaiting operation.

Carried by the lower end of the rotary spindle F is a spring-controlled hand-lever F', having a bent portion $F^2$, which is capable of coming against the member $F^3$ of a weighted crank-arm $F^4$, pivoted at $F^5$ to the under side of the base E. By moving the hand-lever F' the spindle F and the conical block $f^2$ can be partially rotated or oscillated. The said hand-lever is also provided with a vertical pin $F^6$, which projects through a curved slot in the base of the machine and carries a finger $F^7$. When the hand-lever is shifted to the right, the finger $F^7$ strikes against a tappet J', carried by a horizontal axle J, that turns in bearings $J^2$, mounted on the base E. The axle J also carries a pair of dogs $J^3$, whose purpose will be hereinafter explained.

The working of the machine is as follows: A circular sheet of paper or other suitable material having been placed upon the horizontal plaiting-bars A, the upper series of blades are caused to descend by the operation of the before-mentioned treadle acting upon the cross-head H through the intervention of the rod $H^7$ and pivoted lever H'. As the cross-head H descends, the sliding rod G, which is only supported by its collar $g^4$ resting on the cross-head H, also descends by its own weight. So soon as the disk $g'$ at the end of the said sliding rod G comes against the head $a$ (which, as before stated, is fixed) any further descent of the rod G is prevented, with the result that this rod remains stationary while the sleeve $b^5$ and the cup or block $b$ still continue to advance. The tailpieces $b^6$ of the plaiting-blades B then come against the disk $g'$ and are thereby caused to turn inwardly about their pivots $b'$, being assisted in this movement by the moving sleeve $b^5$ and links $b^3$. As the plaiting-blades turn inwardly they tend to press the surface of the paper blank between the series of the plaiting-bars A, and the pressure thus exerted causes the paper blank to press with sufficient force upon the plaiting-bars to turn them inwardly and downwardly about their pivots $a'$ until they lie approximately parallel with the fluted conical block $f^2$, as seen at Fig. 5. The rim of the before-mentioned disk $g'$ prevents the under edges of the plaiting-blades coming too forcibly into contact with the portion of the paper that is bent down over the edge of the head $a$ during the corrugating operation. When the parts have assumed this position, the plaiting or corrugating of the blank has been performed by the plaiting-blades forcing the paper between the plaiting-bars. During this movement the rubber face of the shoulder $g'$ has come against the upper interior surface of the cup or block $b$, and the sleeve $a^5$ has descended to its lowermost position under the action of the links $a^3$, Fig. 5. By so doing the said sleeve $a^5$ has elevated the weighted end of the lever D and depressed its opposite end to such an extent as to allow the member $F^3$ of the weighted crank-arm $F^4$ to bring its notch $F^\times$ above the said lever D. While the said notch $F^\times$ is in this position the weighted end of the lever D cannot again descend. The operator next releases the before-mentioned treadle and thereby allows the weighted lever $H^5$ to raise the upper series of blades through the levers $H^6$ and H'. The rod G meanwhile remains practically in the same position it assumed when its disk $g'$ impinged upon the head $a$, until the top face of the cup or block $b$ comes against the shoulder $g$. The said rod will then be lifted during the further ascent of the blades until the collar $g^4$ on the rod strikes against the cross-bar K'. The rod G is then prevented from rising farther, and the sleeve $b^5$, carried by the cross-head H, continuing to ascend on the rod G, the cup or block $b$ is brought against the shoulder $g$, thereby exerting a pull upon all the links $b^3$. These links consequently turn the plaiting-blades B about their pivots $b'$ and thereby bring them into their horizontal position, Fig. 4. Further upward movement of the sleeve $b^5$ is then prevented by the cross-head H, which carries the sleeve $b^5$, coming against the lower face of the collar $g^4$.

It will be remembered that during the ascent of the upper series of plaiting-blades, the lower series of plaiting-bars are kept in their closed position by the notch $F^x$ of the crank-arm $F^4$ engaging with the weighted lever D. In order to avoid any chance of the corrugated article expanding and thus coming out of engagement with the plaiting-bars when the upper series of blades is elevated, the aforesaid spring-fingers $a^x$ on the links $a^3$ are so disposed that they bear upon the lower portions of the exterior plaits or corrugations of the article and thus hold said article in position upon the lower series of blades or plaiting-bars. While these spring-fingers $a^x$ are holding the corrugated article, the conical block $f^2$ is turned by means of the lever-handle F′, and in this way the inner corrugations are pressed slightly sidewise and an inclination given to them, which has the effect of causing the plaits or corrugations to be more permanently formed, so that when the article is removed from the machine it will more effectually retain its shape. When dealing with material of such a nature that the article tends to alter its shape after removal from the machine, I may, if found necessary, subject the article to a pressing operation on a conical or other suitably-shaped block to insure that it shall retain its form. When the said lever-handle F′ has been shifted to the end of its stroke, the aforesaid bent portion $F^2$ thereon strikes against the member $F^3$ of the crank-arm $F^4$, which is thus displaced from the path of the weighted lever D, and simultaneously with this displacement the finger $F^7$, carried by the pin $F^6$, comes against the tappet J′, and thus turns the axle J and raises the dog $J^3$ thereon. At this time the sleeve $a^5$ is at its lowermost position, and consequently when the aforesaid dogs $J^3$ are raised they come against the said sleeve and give to it sufficient movement to bring the bars A and links $a^3$ out of alinement, so that they do not impede the elevation of the sleeve $a^5$ by the action of the weighted lever D. As the sleeve $a^5$ rises under the influence of the said weighted lever the plaiting-bars A at the same time assume their horizontal position by the divergence of the links $a^3$. The plaited article is then free to be removed from the machine.

It is to be understood that the contour of the parts marked $a$ $a^5$, $b$ $b^5$, $g'$, and $f^2$ conform to the shape of the corrugated article to be produced, that is to say, if, for example, it be desired to produce an article of elliptical shape the parts $a$ $a^5$, $b$ $b^5$, $g'$, and $f^2$ will all be elliptical; but instead of the conical block $f^2$ being capable of rotary movement, I in this case make it stationary. These parts and the bars or blades they carry may be made detachable, so as to permit of their being readily removed and replaced by others of the required shape.

Instead of arranging the machine to be operated by means of a treadle, as above specified, I may equally well arrange it to be operated by power.

When operating upon blanks of such material as paper, I may slightly damp said blanks prior to their insertion into the machine.

What I claim is—

1. In a crimping, plaiting or corrugating machine the combination of a series of radial plaiting-blades pivoted to a block which is free to move longitudinally within certain limits on a sliding rod, a series of links pivotally connected to the plaiting-blades and to a sleeve capable of longitudinal movement on the aforesaid sliding rod, a disk carried at the lower extremity of the sliding rod and adapted to act upon the plaiting-blades, and a fixed collar on the sliding rod for controlling the extent of its movement, the whole operating substantially as described and for the purpose specified.

2. In a crimping plaiting or corrugating machine, the plaiting-blades B each having two pivoted connections and an inwardly-projecting tailpiece, in combination with a disk $g'$ against which the tailpieces are adapted to abut, substantially as described and for the purpose specified.

3. In a crimping plaiting or corrugating machine the combination of a series of radial plaiting-bars upon which the blank to be corrugated is placed, a central fixed block or head to which the plaiting-bars are pivoted, a series of links pivotally connected to the outer ends of the plaiting-bars and to a sleeve capable of sliding on a stationary spindle, and a weighted lever connected to the aforesaid sleeve and normally tending to keep the plaiting-bars in their horizontal position substantially as described and for the purpose specified.

4. The combination of a series of radial plaiting-bars, a central fixed block or head to which the plaiting-bars are pivoted, a series of links pivotally connected to the outer ends of the plaiting-bars, a movable sleeve to which the said links are pivotally connected, a weighted lever connected to the said sleeve by links, a weighted crank-arm pivoted so as to be capable of engaging with the said weighted lever by the action of gravity when the said plaiting-bars assume their vertical position, and a hand-lever which can be operated to throw the weighted crank-arm out of engagement with the weighted lever, all substantially as described.

5. The combination with the series of plaiting-bars of spring-fingers adapted to bear upon the outer corrugations of the corrugated blank when the plaiting-bars are in their closed position, a rotary fluted block, a spindle to which said block is connected, a lever-handle for turning said spindle and block, and a stationary cylinder formed with indentations for receiving the plaiting-bars substantially as described and for the purpose specified.

6. The combination with the movable sleeve $a^5$ to which the plaiting-bars are connected by pivoted links, of dogs $J^3$ carried by a horizontal axis J, a tappet J' on the said axis, a finger or projection $F^7$ carried by a hand-lever F' and adapted to strike against the said tappet J', a locking device, a weighted lever D with which the said locking device engages, and, on the lever F', a bent portion or arm which, when the said lever F' is actuated, strikes against the locking device and releases the weighted lever D just prior to the striking of the aforesaid finger F' against the tappet J', substantially as described and for the purpose specified.

7. The combination with the plaiting-bars A, of a segmental guide-plate I having laterally arranged and adjustable rods I' and provided with radial notches i' in its inner edge and slots i through its face, substantially as described and for the purpose specified.

In testimony whereof I have hereunto set my hand this 26th day of July, 1895.

CHARLES MORITZ.

Witnesses:
ARTHUR R. READ,
JOSEPH LAKE.